United States Patent [19]

Halstrick

[11] Patent Number: 5,199,582
[45] Date of Patent: Apr. 6, 1993

[54] STORAGE RACK SHELVING WITH IMPROVED FIRE PROTECTION

[76] Inventor: Robert T. Halstrick, 1421 Wells Dr., Bensalem, Pa. 19020

[21] Appl. No.: 648,027

[22] Filed: Jan. 30, 1991

Related U.S. Application Data

[63] Continuation-in-part of Ser. No. 522,645, May 14, 1990, abandoned.

[51] Int. Cl.⁵ .................................................. A47F 5/00
[52] U.S. Cl. ..................................... 211/135; 211/127; 211/153; 312/115; 169/10
[58] Field of Search ............... 211/135, 127, 134, 153, 211/133, 186, 187, 191; 312/115; 169/10

[56] References Cited

U.S. PATENT DOCUMENTS

| | | | |
|---|---|---|---|
| 340,210 | 4/1886 | Harknen | 169/10 |
| 431,509 | 7/1890 | Dernell | 312/115 |
| 1,587,693 | 6/1926 | Belond et al. | 211/153 X |
| 3,626,487 | 12/1971 | Seiz | 211/187 X |
| 3,814,034 | 6/1974 | Seiz | 211/187 X |
| 3,986,462 | 10/1976 | Heft | 211/153 X |

Primary Examiner—Carl D. Friedman
Assistant Examiner—Korie H. Chan
Attorney, Agent, or Firm—Zachary T. Wobensmith, III

[57] ABSTRACT

Storage rack shelving with improved fire protection for goods stored on multilevel racks, which includes decking having a plurality of channels, which have drain openings at selected locations to permit fluid from sprinklers thereabove to flow down over the goods into channels under the goods and out to lower level shelving for fire abatement, the shelving being provided with dams at the front and rear of the channels to confine and direct the sprinkler fluid.

3 Claims, 1 Drawing Sheet

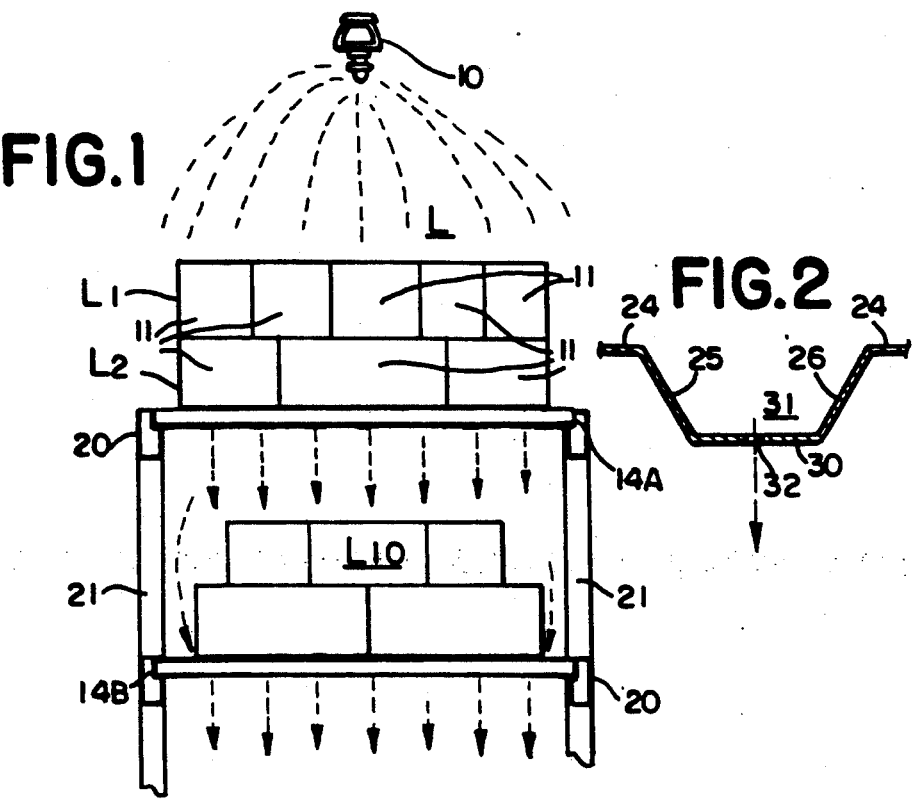
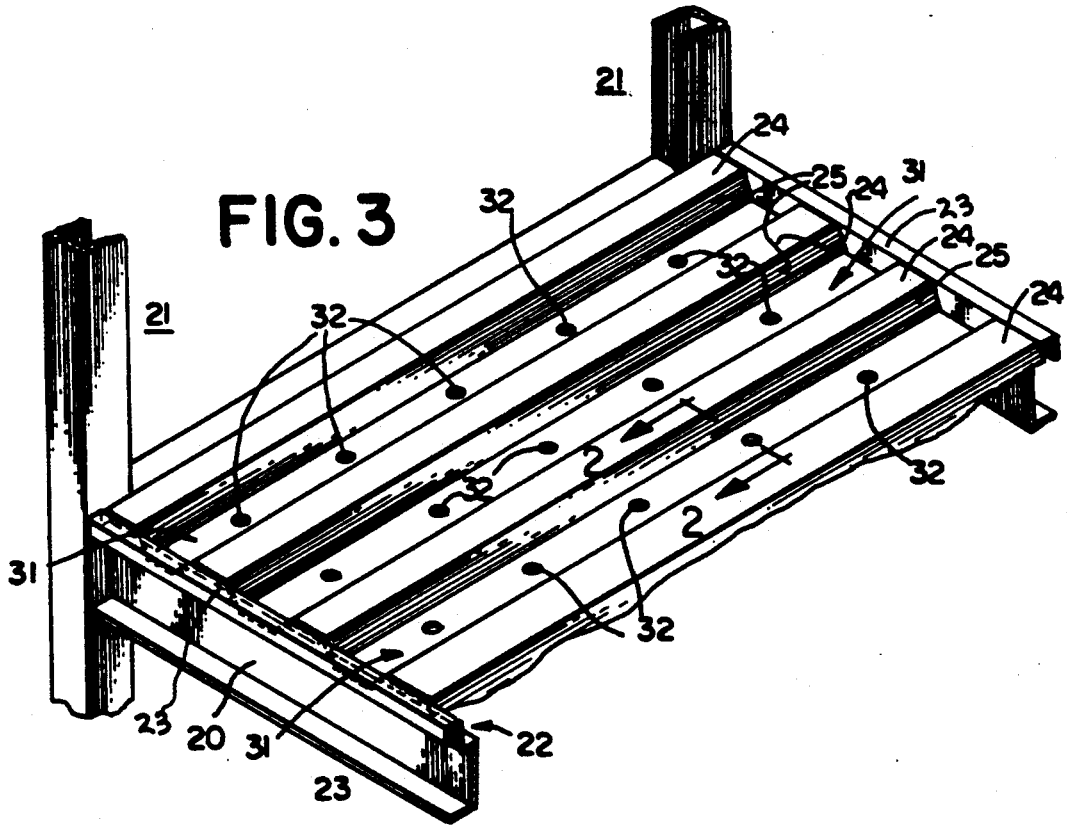

STORAGE RACK SHELVING WITH IMPROVED FIRE PROTECTION

CROSS REFERENCE TO RELATED APPLICATION

This application is a continuation in part of my prior application Ser. No. 522,645, now abandoned, filed May. 14, 1990.

BACKGROUND OF THE INVENTION

1. Field of the Invention

This invention relates to storage rack shelving of the type used in multilevel storage racks, which shelving is of corrugated metal construction with transversely extending channels which have openings of selected size to provide for controlled flow of sprinkler fluid thereout.

2. Description of the Prior Art

When storing goods on multilevel storage racks it is important to be able to provide adequate fire protection for all the levels of stored goods, and to provide for rearrangement of the racks as desired.

The most practical manner of providing fire protection is with overhead sprinklers, which involves pipe runs secured to the ceiling of the storage facility with sprinklerheads at selected locations.

The use of sprinkler heads, which are activated at designated temperatures, and discharge sprinkler fluid downwardly in a bell shaped pattern is satisfactory when the fire is on the topmost level of shelving. However, the sprinkler fluid is unable to penetrate layers of stacked material, and runs off over the edges of the material and down past lower level shelving and possible lower level fire locations.

Various solutions have been proposed to provide fire protection for lower level shelving, the most common of which is to locate sprinkler heads at each level, which is prohibitively expensive, not readily relocatable if the shelving is moved, and subjects the sprinkler heads to damage due to their proximity to the stored goods, which are frequently placed and replaced.

It has also been proposed to use open or wiremesh decking to permit the sprinkler fluid to flow between and down to lower levels of decking. With open mesh decking sprinkler fluid will not flow under the loads on each level, but will flow out over the stacked goods and miss goods at lower levels. Open decking also allows hot air to flow upwardly causing a chimney effect, with the result that the fire spreads quickly, can cause extensive uncontrolled damage, and even overwhelm the sprinkler system.

The U.S. Patent to Harkness U.S. Pat. No. 340,210 illustrates the common form of providing fixed fire protection at various levels by using sprinklers mounted to ceilings and which direct the fluid downwardly. No provisions for controlled sprinkler fluid flow to lower locations is suggested.

The U.S. Patent to E. M. Beland, et al U.S. Pat. No. 1,587,693 discloses a detachable cover for sinks, that is a metal plate with longitudinal corrugations, with perforations to permit water to drain from the concaved parts of the corrugations. No suggestion of use in storage racks is contemplated, no sizing and selected location of openings to permit fluid to flow out at a controlled rate, and to inhibit the upward flow of hot gas and fire.

The U.S. patent to Seiz U.S. Pat. No. 3,626,487 discloses fire and vermin resistant storage structure having fail-safe features. The structure includes upright members with shelves at selected locations, the upright members include a wet upright which has a conduit therein and sprinkler pipes extending between uprights carrying sprinkler heads at each storage level for discharge of water as required. The Seiz structure is typical of prior art structures which are very costly, immovable, and provide sprinklers at each level which results in all the attendant problems that the present invention avoids.

The U.S. Patent to Seiz U.S. Pat. No. 3,814,034 is a continuation in part of the application which formed the parent for Seiz U.S. Pat. No. 3,626,487. The Seiz patent discloses load supports for storage structures, which consists of beams 16, which horzontally span uprights 13, 14 and carry support members 19 which support the goods. The support members 19 are spaced apart at their meeting edges to permit fire retardant material to flow out. However, there are no channels in Seiz as described in the present invention which confine the sprinkler fluid, and directs its flow across the width of the supports, nor is the flow controlled in any manner. The open slots formed by Seiz's members 19 would permit smoke and gas to flow upwardly, which the present invention does not permit, and would not result in a controlled discharge of water onto the goods at lower levels. It should also be noted that Seiz provides sprinklers at all levels where goods are stored, and requires that at least one of the uprights 13 carry the fire retardant material. The Seiz structure has all of the problems that the present invention avoids.

The U.S. Patent to Heft U.S. Pat. No. 3,986,462 discloses a deck structure for racks that includes upright members with shelf beam members connecting them together, and with shelving members on the shelf beams. The shelving members have large openings therealong, and no channels to carry water under loads at the shelf beams, which blocks the fluid from lower levels. The openings in the shelving members would not control the flow of fluid, and would permit hot gases from below to flow upwardly.

The storage rack shelving of the invention does not suffer from the prior art shortcomings, and provides improved controlled fire protection for multilevel storage shelving.

SUMMARY OF THE INVENTION

It has now been found that improved fire protection can be provided by using one level of sprinkler heads for multilevel storage rack shelving, with corrugated decking at each level which has channels below the top surface that have openings of predetermined size at selected locations, with dams at the front and rear of the decking channels, to guide and confine sprinkler fluid so that it flows over and under the goods on each layer of shelving onto deck channels, and out and down to lower levels where it is evenly distributed over the goods stored below for fire abatement.

The principal object of the invention is to provide storage rack shelving that provides multilevel fire protection.

A further object of the invention is to provide storage rack shelving of the character aforesaid that is simple and inexpensive to construct but sturdy and reliable in use.

A further object of the invention is to provide storage rack shelving of the character aforesaid that can be quickly installed, and is easily moved to any desired location.

A further object of the invention is to provide storage rack shelving of the character aforesaid that can be used for storage of a wide variety of goods.

A further object of the invention is to provide storage rack shelving of the character aforesaid that is designed to provide an even distribution of sprinkler fluid from deck channels to each level and to lower levels of shelving.

A further object of the invention is to provide storage rack shelving of the character aforesaid that abates the chimney effect obtained with open mesh shelving.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which:

FIG. 1 is front elevational view, illustrating the storage rack shelving of the invention in a typical storage setting.

FIG. 2 is a fragmentary, vertical sectional view, enlarged, taken approximately on the line 2—2 of FIG. 3 and FIG. 3 is a fragmentary perspective view, enlarged, of a portion of the storage rack shelving of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, and FIGS. 1-3 thereof, a sprinkler head 10 of a run (not shown) is illustrated in operating condition, discharging sprinkler fluid downwardly in a fan shaped pattern over a typical load L, which is illustrated as a plurality of stacked cartons 11. The stacked cartons 11 are shown in two layers L1 and L2 but can be of any desired number, depending on the goods to be stored and the space available. The layer L2 rests on decking 14A which as illustrated is a sheet of metal and preferably steel of well known type. The decking 14A at the front and rear edges is carried on rails 20, which are connected at their ends to vertical posts 21 of well known type. The posts 21 and rails 20 form frames (not shown) which can be connected together by end connectors (not shown) to form sections in well known manner.

The rails 20 are of semi rectangular configuration in cross section, and can be connected to posts 21 with tongues (not shown) in well known manner, with notched walls 22 on which the decking 14A rests, and with a top plate 23 which is the same height as top ribs 24 of the decking 14A, on which the load L rests. Each rib 24 has panels 25 and 26 integral therewith one on each side, extending downwardly at an angle of approximately 45°, and connected to center panel 30 forming channels 31 to be described. The center panels 30 each have a plurality of openings 32 therethrough, which openings 32 are located and sized for proper sprinkler fluid discharge as determined by following parameters to be described. In determing the size and configuration of channel 31 and drainage openings size and location the following relationships must be observed.

The channels must be of sufficient size for gravity flow of sprinkler fluid to all drainage openings supplied by the channel but provide an efficient air shield to prevent hot air and fire from flowing upwardly.

The drainage openings in each channel must be sufficiently restrictive to allow sprinkler fluid to flow back to the center of each level under the load. If the openings are too large all sprinkler fluid will be drained near the edges of the load above, and none will flow back to the center of the level for discharge onto the next level. If the drainage openings are too small total sprinkler fluid discharge cannot be handled.

It has been found that sprinkler discharge of 0.4 to 0.7 gallons per minute per square foot of area protected, provides satisfactory performance.

EXAMPLE

The following calculations for a sprinkler fluid discharge of 0.4 to 0.7 gallons per minute per square foot of area can also serve as a model for any desired sprinkler fluid discharge rate and channel configuration.

The decking cross section shown in FIG. 1 was selected together with the $2\frac{1}{2}''\times 6''$ round hole pattern shown in FIG. 2. The proper hole size to suit this arrangement can be calculated as follows.

Each opening drains an area of $2\frac{1}{2}''\times 6''$ or 0.1042 square feet. Hence the flow required per opening at the maximum rate of 0.7 gallons per minute:

$$Q = \text{flow rate hole} = 0.7 \times .1042$$
$$= .073 \text{ gallons per minute}$$
$$= 16.8 \text{ cubic inches per minute}$$
$$= .281 \text{ cubic inches per second}$$

The general equation for steady state fluid flow is: (Bernoulli)

$$\frac{p_1}{w} + \frac{v_1^2}{2g} + h_1 = \frac{p_2}{w} + \frac{v_2^2}{2g} + h_2$$

Where
p = pressure, lb. per square inch
w = specific weight, lb. per cubic inch
v = velocity, inches per second
g = acceleration of gravity, 386 inches per second
h = height, inches Since no external pressure is applied, $p_1$ and $p_2$ are zero. Since the vertical velocity of fluid at the open surface above the openings is zero and height of the fluid column at the opening exit is zero, the equation becomes:

$$h_1 = \frac{v_2^2}{2g} \text{ or } v = \sqrt{2gh}$$

Since Q = vA where A is the cross section area of the opening in square inches:

$$v = \frac{Q}{A} = \sqrt{2gh}$$

-continued or:

$$A = \frac{Q}{\sqrt{2gh}}$$

The openings as manufactured in production are similar in cross section to the "sharp edged orifice" shown on page 3–69 of "Marks Mechanical Engineers handbook" for which an overall flow coefficient of 0.61 is shown. Hence:

$$.61A = \frac{Q}{\sqrt{2gh}} \quad A = \frac{1.64Q}{\sqrt{2gh}}$$

Since this particular design is for sprinkler fluid discharge of 0.4 to 0.7 gallons per minute per square foot, at maximum flow of 0.7 gpm the channels should be almost full. The overall inside height of the channel is 0.534", so assuming a liquid column height of 0.500 above the openings, the opening cross section area becomes:

$$\begin{aligned} A &= \frac{(1.64)(.281)}{\sqrt{(2)(386)(.500)}} \\ &= \frac{.461}{19.65} \\ &= .0235 \text{ square inches} \end{aligned}$$

And the diameter $D = \sqrt{\frac{4A}{\pi}}$ $= .172$ inches

The sizing and location of the openings 32 will provide and maintain an even distribution of sprinkler fluid to lower levels up to 0.7 gallons per minute per square foot of area.

Since the top plate 23 of rails 20 is above the channels 31, fluid from the sprinkler head 10 will not flow over the rail 20, but will remain in the channels 31, and be discharged from the openings 32 onto the next lower level of decking.

As seen in FIG. 1 two levels of decking 14A and 14B are illustrated.

Decking 14A has been described above. Decking 14B and supporting rails 20 are identical to decking 14A described above. A load L10 is shown on decking 14B, of different configuration but which is subject to the same fire abatment action as described. Additional levels of decking (not shown) can be provided with the same fire abatement action. It should be noted that the decking 14A and 14B have an open area of less than ½ of 1% of total deck area, which eliminates the chimney effect resulting from the use of wire mesh and other uncontrolled decks.

The mode of operation is believed to be apparent from the foregoing.

It is thus apparent that structure has been provided with which the objects of the invention are achieved.

I claim:

1. Storage rack shelving for storing goods at multiple levels in combination with at least one overhead run of sprinkler heads to provide a supply of sprinkler fluid, which is discharged upon demand onto the topmost level of goods, which fluid then flows over and down the sides of the goods underneath and out onto subsequent lower levels to provide improved fire protection, said storage rack comprises:
a plurality of vertical upright posts,
at least two horizontal rails connecting at least two of said posts together at least two vertical locations,
said rails each having a notched wall and a top plate, said top plate connected to a top edge of said notched wall,
decking to support said goods, connected to and extending along said rails at said vertical locations,
said decking having center panels carried by said notched wall,
angularly inclined panels connected to said center panels and extending upwardly therefrom so as to define a plurality of channels therewith to contain and guide sprinkler fluid that flows over said goods from said supply, and
top ribs each of which is connected to a pair of said inclined panels at a location between a pair of said channels to support the goods,
a plurality of sized drainage openings in said channel center panels at selected locations, to permit said fluid to flow thereout and down to said lower levels, and
said top plates of said rails are in the same plane as said decking top ribs to confine said fluid to said channels.

2. Storage rack shelving as defined in claim 1 in which said decking is a sheet of metal.

3. Storage rack shelving as defined in claim 1 in which said drainage openings are sized to provide a sprinkler fluid discharge rate of 0.4 to 0.7 gallons of fluid per minute per square foot of deck area.

* * * * *

UNITED STATES PATENT AND TRADEMARK OFFICE
CERTIFICATE OF CORRECTION

PATENT NO. : 5,199,582

DATED : April 6, 1993

INVENTOR(S) : Robert Halstrick

It is certified that error appears in the above-identified patent and that said Letters Patent is hereby corrected as shown below:

Claim 1, column 6, line 21, after "at" and between "least" insert --at--.

Signed and Sealed this

Twenty-eighth Day of December, 1993

Attest:

BRUCE LEHMAN

Attesting Officer     Commissioner of Patents and Trademarks